United States Patent [19]

Schillings et al.

[11] Patent Number: 4,899,831

[45] Date of Patent: Feb. 13, 1990

[54] FRONTAL CONNECTION APPARATUS FOR TRACTORS

[75] Inventors: Dieter Schillings, Willich; Bernard Peters, Cologne; Hans G. Oellers, Monchen-Gladbach, all of Fed. Rep. of Germany

[73] Assignee: J. I. Case Company, Racine, Wis.

[21] Appl. No.: 342,994

[22] Filed: Apr. 24, 1989

Related U.S. Application Data

[63] Continuation-in-part of Ser. No. 132,235, Dec. 14, 1987, abandoned.

[30] Foreign Application Priority Data

Dec. 22, 1986 [DE] Fed. Rep. of Germany ....... 3644019
Jul. 3, 1987 [DE] Fed. Rep. of Germany ....... 3719725

[51] Int. Cl.$^4$ ................ A01B 59/048; A01B 63/108
[52] U.S. Cl. .................................. 172/810; 172/439; 172/611
[58] Field of Search ............... 172/810, 443, 439, 817, 172/449, 451, 450; 280/460 A, 461 A, 481, 491 R, 491 B; 414/703

[56] References Cited

U.S. PATENT DOCUMENTS

| | | | |
|---|---|---|---|
| 2,608,924 | 9/1952 | Bywater et al. | 172/810 |
| 2,919,754 | 1/1960 | Walberg | 172/540 |
| 2,970,654 | 2/1961 | Todd | 172/449 |
| 2,998,734 | 9/1961 | Bunting | 172/449 |
| 3,800,447 | 4/1974 | Harvey | 172/817 |
| 4,519,623 | 5/1985 | Orthman | 280/481 |
| 4,659,102 | 4/1987 | Stuhrmann et al. | 280/481 |
| 4,715,770 | 12/1987 | Kryscyk | 172/443 |
| 4,778,195 | 10/1988 | Vacon | 280/481 |

FOREIGN PATENT DOCUMENTS

| | | |
|---|---|---|
| 0133637 | 6/1985 | European Pat. Off. . |
| 2718959 | 2/1978 | Fed. Rep. of Germany . |
| 2758978 | 5/1979 | Fed. Rep. of Germany . |
| 3209849A1 | 9/1983 | Fed. Rep. of Germany . |
| 3216589A1 | 11/1983 | Fed. Rep. of Germany . |
| 2074720 | 8/1971 | France . |
| 2033720 | 5/1980 | United Kingdom . |

Primary Examiner—Richard J. Johnson
Attorney, Agent, or Firm—Peter N. Jansson, Ltd.

[57] ABSTRACT

Improved tractor frontal three-point connection apparatus with lower links attached to the front bolster at a pivot axis behind the front panelling of the tractor housing and pivotable to positions behind such panelling, the lower links having rear extensions acted on by lower ends of substantially vertical hydraulic cylinders to pivot the lower links to a substantially vertical orientation, thereby facilitating movement of lower links to inoperative positions over the front axles. Preferred embodiments include a tubular rock shaft rotatably mounted on the front bolster and having rearwardly extending cylinder-attachment lugs, opposite ends removably receiving journals of the lower links, and pocket members at each end receiving and interacting with the rear extensions of the lower links.

18 Claims, 9 Drawing Sheets

FRONTAL CONNECTION APPARATUS FOR TRACTORS

RELATED APPLICATION

This is a continuation-in-part of our patent application Ser. No. 132,235, filed Dec. 14, 1987, originally entitled APPARATUS FOR THE FRONTAL CONNECTION OF EQUIPMENT TO AGRICULTURALLY USABLE MOTOR VEHICLES, IN PARTICULAR FARMING TRACTORS, now abandoned.

FIELD OF THE INVENTION

This invention is related generally to apparatus for the frontal connection of equipment to work vehicles and, more particularly, to three-point frontal connection apparatus for tractors.

BACKGROUND OF THE INVENTION

The three-point connection devices of this invention are of the type used for connection of various kinds of work equipment at the front of a tractor. Such equipment typically operates on or near the ground at a position well in front of the front panelling of the tractor, that is, the front of the engine housing. Such front panelling is a reference location which is useful in describing this invention. Another useful reference point is the front bolster of the tractor, that is, the major lower structural member to which the front axle structure is attached.

The frontal connection devices of this invention are of the type which typically include two forwardly-extending pivotable lower links, hydraulic cylinder means acting on the lower links, and an upper link secured to an upper connecting lug. The hydraulic cylinder means, typically a pair of hydraulic cylinders, raises and lowers the lower links.

Widely varying tractor frontal connection devices have been developed over the years. In many cases, the lower links are pivotably mounted on a connection frame of the like which itself is secured to the front of the tractor. Many of such devices are add-on devices. The hydraulic cylinders are typically attached at one end to such frame and at the other end to the lower links, most typically at a position on the lower link between the pivot connection point and the distal end used for attachment of equipment. Such connection frames are attached at various points to the tractor structure, in some cases to the front bolster which also bears the front axle of the tractor.

German Offenlegungsschrift No. 3,216,589 discloses one such apparatus. In the device of such document, the lower links are mounted on laterally-spaced forwardly-extending members which are bolted at their rear ends to the tractor fastening points used for a front loader and supported at their front ends by means of brackets on the front bolster, where they are interconnected by a cross member which also serves to carry the connecting lugs for the upper link.

In such device of the prior art, the hydraulic cylinders act on rear extensions of the lower links to effect raising of said links. However, due to their approximately horizontal orientation it is not possible for the lower links to swing sufficiently up and back to properly facilitate their movement to behind the forwardmost portion of the front panelling of the tractor. As a result, even with the lower links raised, their forward protrusion poses a danger for other traffic when the front equipment is removed. As a result, placement of caution markings or other warnings are often required during vehicle movement in such condition.

In order to locate the points of pivot attachment of the lower links of a front-mounted hydraulic three-point linkage at a position far enough back on a tractor that they are in the region of the front wheels, it is known from European Pat. No. 0133637 to pivotably mount the two lower links at a position behind the forwardmost point of the front panelling of a tractor, and also to locate the hydraulic cylinder means at such position. However, such arrangements fail to consider other important requirements for frontal connection apparatus, including the need to accommodate a power take-off shaft, ballast weights, and a draft jaw.

Another disadvantage of such known arrangement is that, due to the overall configuration of the device and orientation of the hydraulic cylinder in such arrangement, the lower links cannot be retracted fully behind the forwardmost point of the front panelling when not in use. It is necessary that they be removed entirely if they are not required, and removal is a fairly difficult operation.

Referring to other prior art, it is known from German Offenlegungsschrift No. 2,758,978 to fasten a unitary casting on the front side of the front bolster, with such casting being used as the bearing element for front-mounted implement hitch means, including the hydraulic lifting cylinder. It is noteworthy that such casting device has a central recess access to a front-mounted power take-off shaft and, below such access means includes an integral draft jaw.

In such arrangements, it is a disadvantage that the upper and lower links project so far forward that they impair connection of an implement to the power take-off shaft. Such extreme forward projection also requires removal of the links to allow connection of an implement to the draft jaw. Furthermore, with or without an implement connected to the upper and lower links, the lower links cannot be swung behind the front surface of the front panelling. The positioning of the hydraulic cylinder in front of the front panelling further blocks such retraction of the lower links.

German Offenlegungsschrift No. 3,209,849 discloses a front-mounted power lift mechanism for tractors which has lower links pivotably secured to laterally-spaced bearing plates. The lower links are swung by vertically orientated hydraulic cylinders and are interconnected by a cross member which is in front of the front panelling of the tractor. The orientation of the cylinders and the presence of the cross member prevent retraction of the lower links behind the front surface of said panelling. The laterally-spaced bearing plates are interconnected in their upper front regions by a cross-member which carries connecting lugs for the upper link. However, there is no provision for the carrying of ballast weights.

German Offenlegungsschrift No. 3,306,415, noting the problems associated with the forward projection of frontal connection devices and the difficulty of removing links, deals with the problem by providing a bumper which is secured to the front ends of the lower links, rounded off at the sides and the front in the direction of collision, and covers the front ends of the lower links in all positions. However, a disadvantage of this arrangement is that the bumper has to be removed in order to couple implements to the power lift mechanism.

German Offenlegungsschrift No. 2,718,959 discloses a tubular member into which journals for locating the rear ends of the lower links can be inserted. However, the journals are not connected to the lower links but instead pass through the links and through plates fixed thereto. This patent is noted here only for its minor visual similarity to a single feature of the invention herein.

There are a variety of additional shortcomings and problems and in devices of the prior art. Many devices are most difficult to connect and disconnect. Others are complex and frequently in the way. Still others impede the use or operation of other devices on the tractor. For others, operation can be problematic.

There is a well-recognized need for an improved tractor frontal connection apparatus.

OBJECTS OF THE INVENTION

It is an object of this invention to provide an improved tractor frontal connection apparatus overcoming some of the problems and shortcomings of the prior art, including those mentioned above.

Another object of this invention is to provide a tractor frontal connection apparatus which does not obscure an operator's view or otherwise pose a danger during tractor use without attached equipment.

Another object of this invention is to provide improved tractor frontal connection apparatus which does not block attachment of other equipment.

Another object of this invention is to provide improved tractor frontal connection apparatus which may easily be fully retracted.

Another object of this invention is to provide improved tractor frontal connection apparatus having readily removable lower links, yet firmly connected in place.

Another object of this invention is to provide an improved tractor frontal connection apparatus which is fully integrated with the tractor.

These and other important objects will be apparent from the descriptions of this invention which follow.

SUMMARY OF THE INVENTION

This invention is a tractor frontal connection apparatus of the type including a tractor with front panelling and a front bolster bearing a front axle, two forwardly-extending pivotable lower links, hydraulic cylinder means acting on the lower links, and an upper link secured to an upper connecting lug. The invention overcomes certain shortcomings and problems of the prior art, including those mentioned above.

The frontal connection apparatus of this invention is characterized by the lower links being attached to the axle-bearing front bolster. Such attachment is at a pivot axis behind the forwardmost point of the front panelling, and such lower links are pivotable to positions behind said forwardmost point. The lower links have rear extensions rearward of the pivot axis. The hydraulic cylinder means used in this invention is substantially vertically oriented and has a lower end acting vertically on the rear extensions. Given the configuration of this invention as described, full extension of the hydraulic cylinder pivots the lower links to a substantially vertical orientation, and this serves to facilitate movement of the lower links upwardly and rearwardly toward inoperative positions over the front axle.

Preferred embodimentls of this invention include a tubular rock shaft which is rotatably mounted on the front bolster along the aforementioned pivot axis. The rock shaft has lower lug means extending therefrom in a generally rearward direction, used for pivoting purposes, as hereafter explained. The lower links have journals removably extending into opposite ends of the tubular rock shaft. A pocket member is secured to each end of the rock shaft, and each pocket member receives one of the rear extensions and has a retaining flange adjacent to such rear extension for axial retention of the lower links on the rock shaft.

The hydraulic cylinder means lower end is (are) attached to the lower lug means such that the cylinder means rotates the rock shaft to raise and lower the lower links. The lower links are rotationally joined, for lifting purposes, to the rock shaft as follows: Each pocket member, one at each end of the rock shaft, has a laterally-extending front end portion positioned for engagement with the rear extension to limit relative angular movement of the pocket member and the rear extension. This means that with further rotation of the rock shaft the front end portions of the pocket members engage the rear extensions to rotate the lower links in an upward and rearward direction.

In certain preferred embodiments, the retaining flange of the pocket member has a generally radially extending rear edge which is positioned such that rearward manual rotation of each lower link relative to the pocket member rotates the rear extension beyond the retaining flange. Thus, each lower link may readily be manually disengaged from the rock shaft.

In some preferred embodiments, the front bolster has securement holes on either side thereof in position above the pivot axis. Such securement holes may be engaged by removable stop bolts which would extend laterally into the paths of the lower links. Using such stop bolts, the lower links may be secured in raised inoperative positions such that they do not flop forward and down into the way.

In certain preferred embodiments, the front bolster has a central front recess which can receive a power take-off casing. Furthermore, a bearing element is secured to the front bolster and performs several functions. Such bearing element is adapted to carry ballast weights. It also defines a draft jaw and supports a draft jaw bolt extending through the draft jaw. Furthermore, it is used to secure the upper end of the hydraulic cylinder means and has on it the upper connecting lug for the upper link.

In such embodiments, a chain holder may be pivotably mounted in the draft jaw by means of the draft jaw bolt. Such chain holder has a pair of laterally-extending arms with chain link securement means on it. A pair of chains, each connected to one of the lower links, extend upwardly to engagement of a selected chain link with one of the chain link securement means. This arrangement allows the lower links to be adjustably suspended by the chains to define an adjustable lowest position of lower link movement by the hydraulic cylinder means.

In highly preferred embodiments, each pocket member, in addition to having the retaining flange and front end portion, has a pocket main portion which extends radially with respect to the pivot axis and is adjacent to the retaining flange. At least one pair of aligned holes are in the pocket main portion and the retaining flange. Such holes are radially spaced from pivot axis by a distance less than the radial dimension of the lower link rear extensions, and a retaining bolt extends through the aligned holes to engage the rear extension. With this arrangement, the extent of angular float of the lower links with respect to rock shaft may be limited.

In such arrangements, it is highly preferred to have a plurality of such pairs of aligned holes. In such cases, the retaining bolt is selectively insertable into the holes of one of the pairs, which allows the angular float of each lower link to be changed.

In any arrangement limiting the angular float in this way, the retaining bolts can be the same bolts as are used for stop bolts to secure the lower links in inoperative positions. In other words, such bolts can be used alternately to set the extent of angular float of the lower links during operation and to secure the lower links in inoperative positions.

The manner of application of hydraulic force on the lower links of this invention differs from that in most prior devices. Force is applied downwardly to a rearwardly extending member at a position to the rear of the pivot axis. Furthermore, the vertical orientation of the cylinder and its manner of securement facilitate retraction of the lower links to their inoperative positions. Final movement of the lower links over the front axles to their inoperative positions can be carried out manually with ease.

The arrangement of parts of this invention allows power take-off casing and ballast weights to be integrated in improved fashion into the apparatus. Furthermore, an improved overall view from the tractor cab and better styling of the tractor front end are important advantages of this invention.

The aforementioned chain arrangement for defining the lowermost point of lower link movement has good advantage. It allows adjustment of the lowermost position to the positions required for different implements or working positions. While this is known in itself, prior chain adjustments have been effected by means of bolts and brackets secured to the lower links, and this requires auxiliary tools for connection and disconnection of brackets and the like.

The chain holder previously described, which may be pivotally mounted in the draft jaw, has arms extending laterally with respect to the direction of travel. Any one link of each chain can be suspended at the ends of the chain holder arms without auxiliary tools. The extended lengths of the chains provide positive location of the lower links in the required working positions. By utilizing the chain pitch, the lowered positions of the respective lower links can be adjusted differently, without the need for turnbuckles and the like, which often tend to rust and bend.

Another advantage is that the pivotable chain holder allows the lift linkage to swing to provide optimum load distribution. This is not the case with known arrangements due to production tolerance problems.

DETAILED DESCRIPTIONS OF PREFERRED EMBODIMENTS

Figure 10:
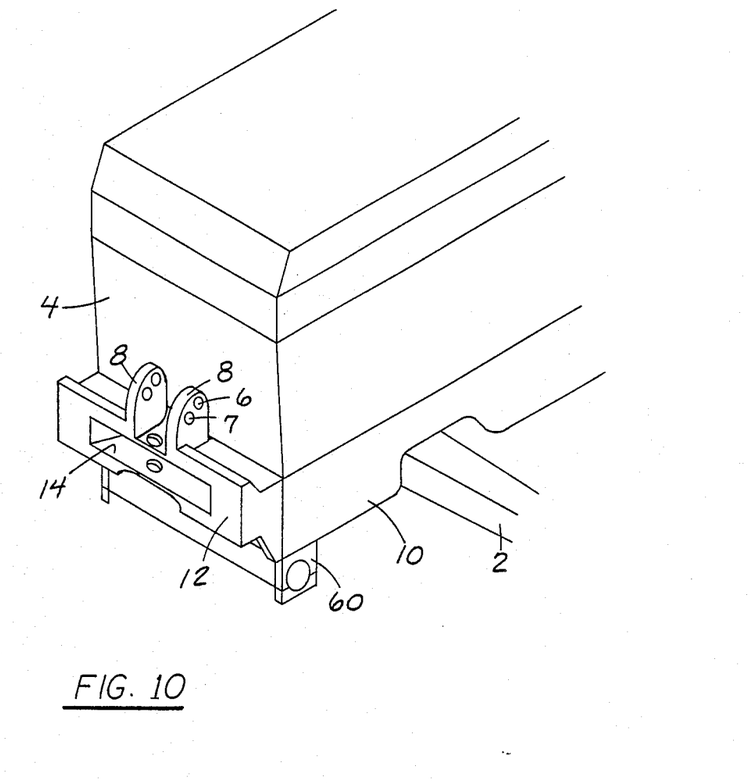
FIG. 10 is a fragmentary perspective view of a tractor frontal connection apparatus, included to show the locations of the rock shaft mount, front axle structure and the bearing element and parts thereof relative to the tractor front bolster and front panelling.
Figure 11:
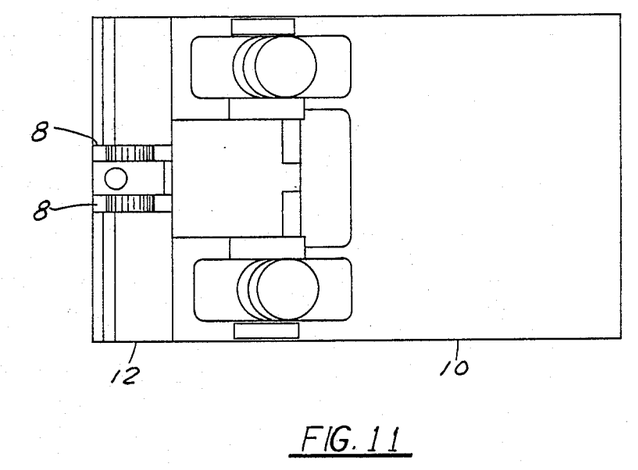
FIG. 11 is a fragmentary top view of FIG. 10 with the engine housing, engine and other parts removed.
Figure 12:
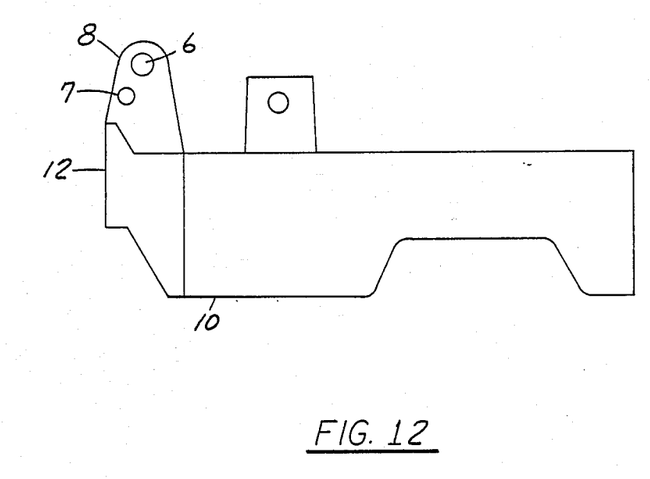
FIG. 12 is a side elevation of the apparatus shown in FIG. 11.

Throughout the drawings, including different embodiments which are shown, the same numbers are used to identify similar parts. As illustrated in the figures, particularly FIG. 10, a tractor has a front bolster 10 which supports a front axle structure 2, a front wheel 1 (see FIGS. 1 and 2), and an engine housing including front panelling 4. Front bolster 10 includes a downwardly extending rock shaft attachment portion 60 (see FIGS. 1 and 10), in which a rock shaft 3 is pivotably mounted. A bearing element 12 is secured to the front of front bolster 10, as shown in several of the figures.

Rock shaft 3, which is in the vicinity of front axle 2 in a position forward thereof, supports two lower links 5, which are laterally disposed outside the housing and, when in their lowered positions, extend forward well beyond front panelling 4. Spaced from rock shaft 3, in upwardly extending lugs 8 on the upper side of bearing element 12, are two holes 6, 7 for pivotable attachment of an upper link 9. When not in use, upper link 9 is clipped to front panelling 4 in an approximately vertical inoperative position.

Figure 13:
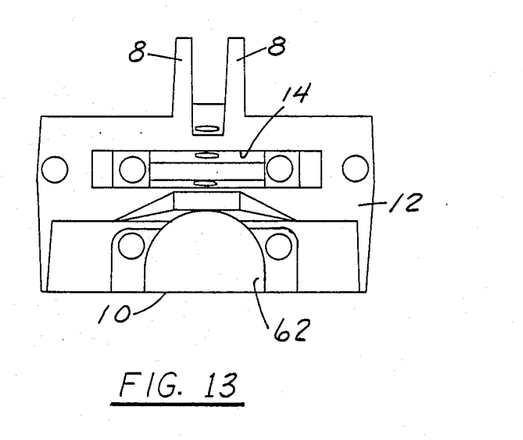
FIG. 13 is a front elevation of the apparatus shown in FIG. 11.

Front bolster 10, which provides the support for all frontally connectible components, is a cast frame. The term "front bolster" as used herein refers to the member for mounting the front axle or to a separate casting rigidly attached thereto or integrally formed therewith. Front bolster 10 includes a central recess 62 (see FIG. 13) for receiving a power take-off casting 11 (see FIGS. 1-3, 8 and 9). On the front side of front bolster 10 there is provided means for securing bearing element 12, as earlier noted, and bearing element 12 is adapted to carry ballast weights 13. In the center, between the two separate groups of ballast weights 13, bearing element 12 forms a draft jaw 14. Draft jaw 14 has a draft jaw bolt 36 therethrough to facilitate coupling of certain equipment.

Lower links 5 can be swung between a lowered position 15 and an upper position 16. In addition, lower links 5 can be swung to an inoperative position behind the forwardmost point of the front surface of front panelling 4, as shown in phantom lines in FIG. 2. In their inoperative positions, lower links 5 do not form an obstacle endangering other traffic.

Figure 6:
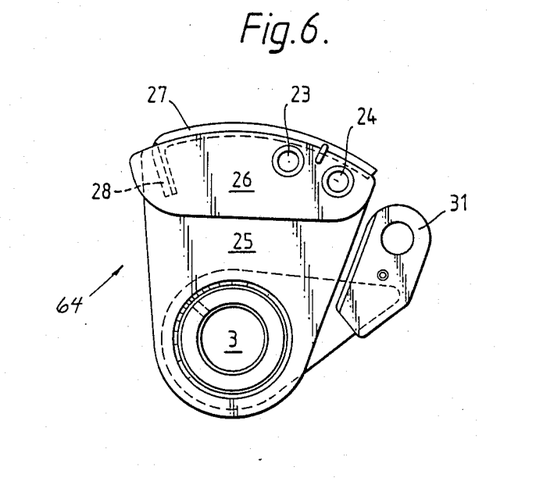
FIG. 6 is an end view of the rock shaft, illustrating the rear extension of the lower link in phantom lines.
Figure 7:
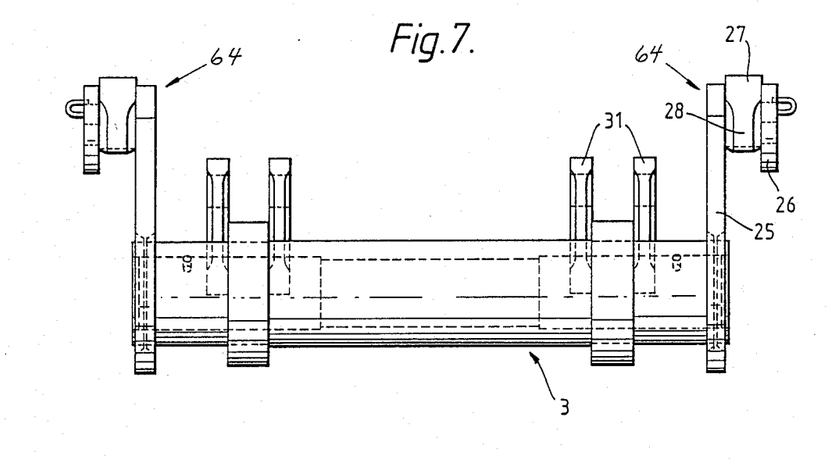
FIG. 7 is a front view of the rock shaft.

As shown in FIGS. 6 and 7, rock shaft 3 is tubular and has fixed to it two pairs of connecting lugs 31 for left-hand and right-hand single-acting hydraulic cylinders 21, which are supplied with pressurized liquid by way of connections 20 when raising of the lowered links is required. The line of action of each cylinder 21 is indicated by the reference number 34.

Figure 1:
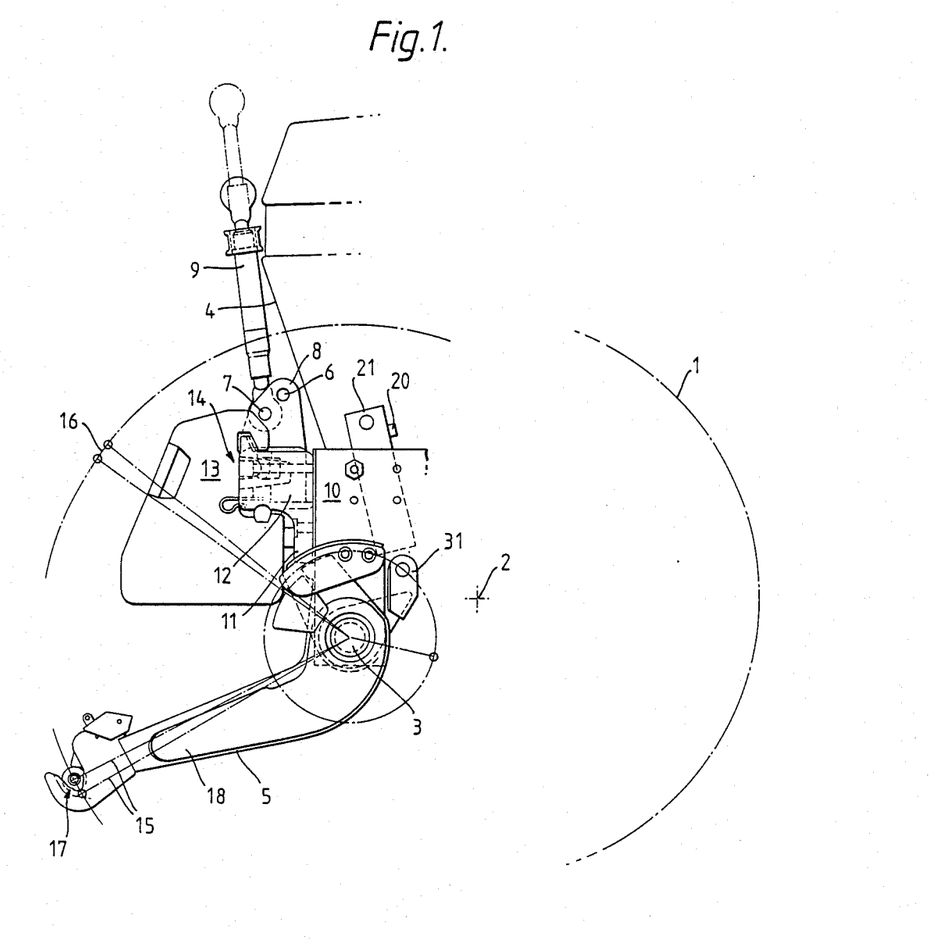
FIG. 1 is a diagrammatic side view of a preferred embodiment of the tractor frontal connection apparatus of this invention with lower links in lowered position, upper link in inoperative position, and suspended ballast weights.
Figure 2:
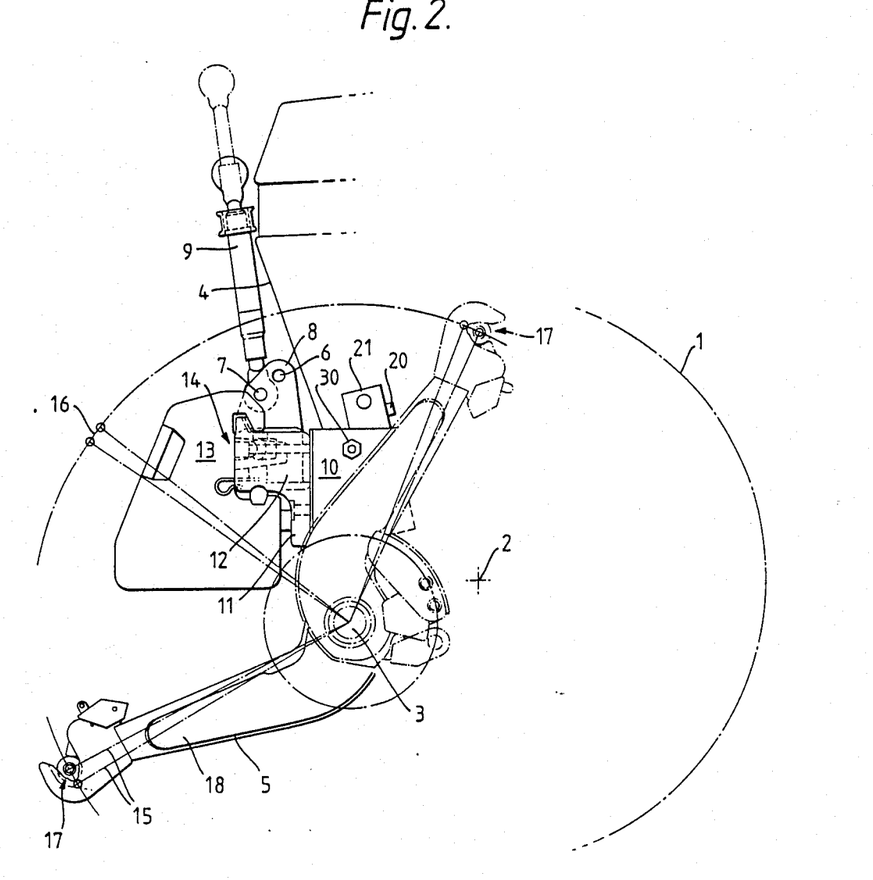
FIG. 2 is a similar view illustrating the lower links in phantom lines swung into their inoperative positions.
Figure 3:
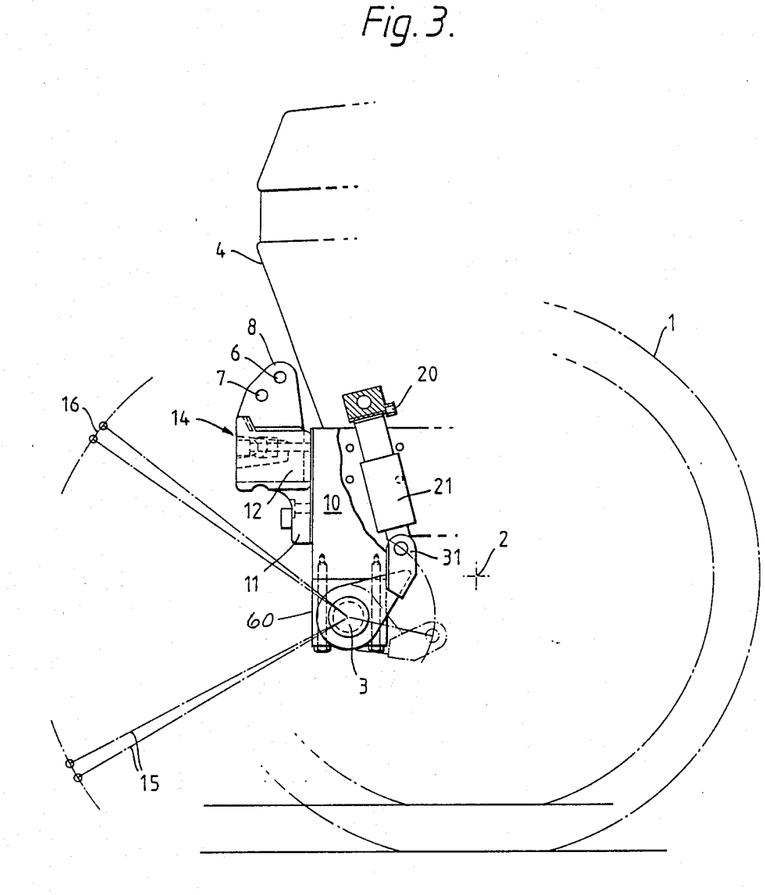
FIG. 3 is a side view partly in section, taken in a vertical plane through one of the hydraulic cylinders.
Figure 4:
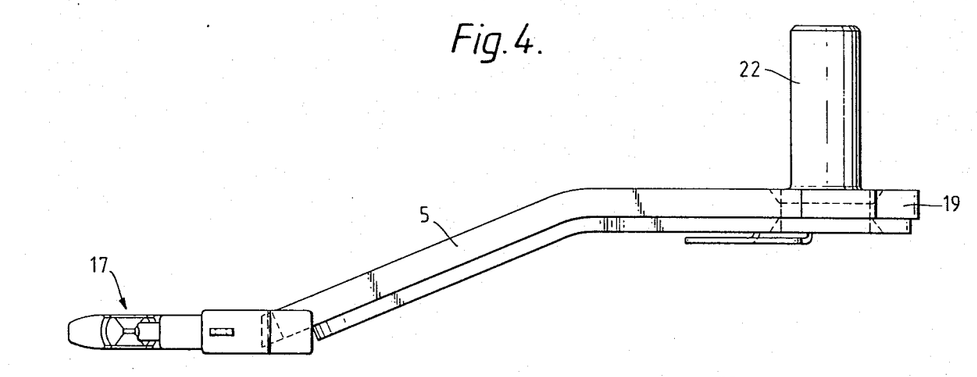
FIG. 4 is a plan view of one of the lower links.
Figure 5:
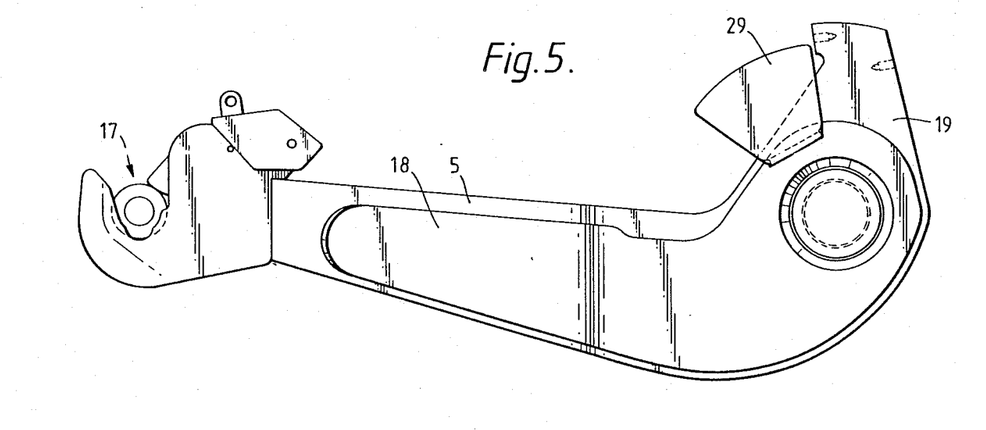
FIG. 5 is a side view of such lower link.

As shown in FIGS. 1-3, but most particularly in FIGS. 4 and 5, each lower link 5 is formed as a bell-crank with respect to rock shaft 3. The front ends of lower links 5 have coupling points 17 for attachment of an implement, and the links are reinforced by stiffening plates 18.

Beyond the axis of rock shaft 3, each lower link 5 has a rear extension 19. Each rear extension 19 forms an obtuse angle with the forwardly-extending part of lower link 5, that is, the part for attachment of an implement at coupling point 17, in order that rearward extension 19 does not dip too far and in order that adequate ground clearance is provided when the three-point linkage is raised such that lower links 5 reach their inoperative positions.

Each lower link 5 is removably fitted into one end of tubular rock shaft 3 by means of a journal 22 (see FIG. 4). Each lower link 5 is then rotated until its rear extension 19 engages near its end in a pocket formed by pocket members 64 secured to either end of rock shaft 3. Each pocket member 64 includes a pocket main wall 25 which extends radially from the main portion of rock shaft 3. Each pocket member 64 is provided on its periphery, concentric with the axis of the rock shaft 3, with a laterally protruding member 27 having an outer retaining flange 26. Retaining flange 26 is positioned such that lower link 5 is axially fixed thereby relative to rock shaft 3.

Each pocket member 64 also has a front end portion 28 which is directed towards the axis of the rock shaft 3 and is positioned for engagement with rear extension 19 of lower link 5 during rotation thereof. This engagement limits forward angular movement of rear extension 19 relative to pocket member 25 and, thus, relative to rock shaft 3.

Pocket main wall 25 and retaining flange 26 have two pairs of aligned holes therein for selective insertion of a retaining bolt 30. By virtue of retaining flange 26, when in one aligned pair of holes 23, lower link 5 is substantially rigidly fixed relative to rock shaft 3. By inserting bolt 30 in mutually aligned holes 24, on the other hand, lower link 5 is connected to the rock shaft 3 with a limited angular float.

In order to obtain different lowered positions of the lower links 5, to compensate, for example, for different sizes of front tractor wheels, shims can be bolted to either side of the rearward extensions 19. This allows vertical adjustment of approximately 70 mm to be obtained.

In order to avoid errors in inserting retaining bolt 30 in holes 23 or 24 of pocket 64, a guard plate 29 is welded onto each lower link 5 in the region of rock shaft 3. Each guard plate 29 protrudes radially from the pivot axis and covers the holes 23 and 24 when lower links 5 are raised manually. This prevents insertion of retaining bolt 30 in front of rearward extension 19, which can otherwise be done so that raising the lower links to a position behind the front panelling would be blocked, as is desirable when an implement is attached. Such insertion is desirable to avoid the damage which could occur by attempting to fully raise lower links 5 with an implement attached.

Retaining bolt 30 can be used as a stop bolt to secure lower links 5 in inoperative position when hydraulic cylinders 21 are completely extended. This can be accomplished by removing bolt 30 from holes 23 or 24 and inserting it in a hole provided in the front bolster lo, as shown in FIG. 2. Lower links 5 are then mechanically locked against swinging in a forward direction.

Figure 8:
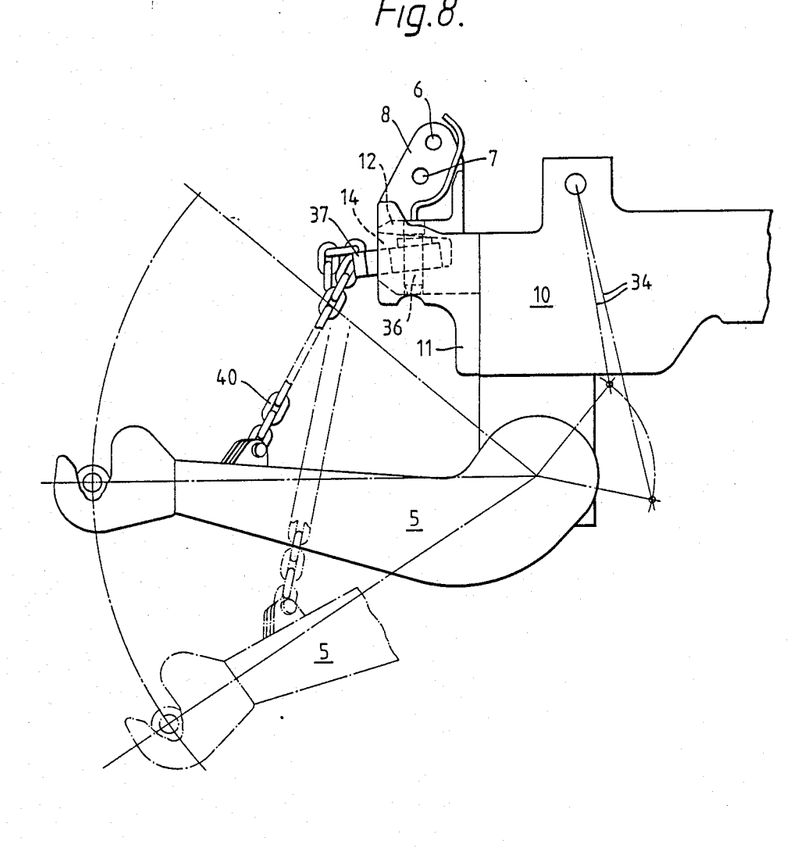
FIG. 8 is a schematic side view of the tractor frontal connection apparatus with the lower links suspended by chains, illustrating the draft jaw and the connecting lugs for the upper link.
Figure 9:
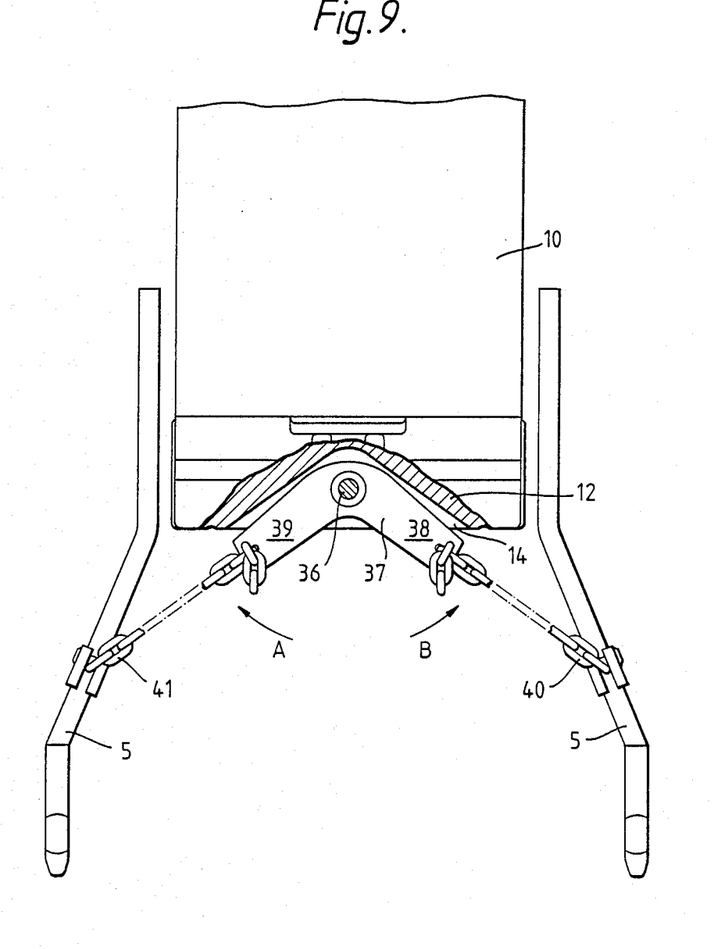
FIG. 9 is a top plan view of FIG. 8, partly in section, with the holder for the chains pivotably mounted in the draft jaw.

As shown in FIGS. 8 and 9, when draft jaw 14 is not in use for coupling an attachment, a chain holder 37 can be mounted in draft jaw 14 by means of bolt 36. Chain holder 37 has, as best illustrated in FIG. 9, an obtuse-angled shape. Chain holder 37 can pivot about bolt 36, as indicated by arrows A and B in FIG. 9. At the ends of its arms 38, 39, which extend laterally and forwardly, any of the links of two chains 40 and 41 can be attached. The lengths of the chains determine the lowest position of lower links 5. Lower links 5 are mechanically stopped in separately adjustable lowered positions. They can be raised by hydraulic cylinders 21 and lowered again as far as the adjusted chain lengths will allow.

Suitable choice of chain strength ensures that chains 40 and 41 will not be overstressed during lowering of the lower links 5 by the hydraulic cylinders 21. Because single-acting hydraulic cylinders are used in the illustrated embodiment, the only thing which should be taken into consideration in choosing chain strength is the effect of the implement weight.

Chains 40 and 41 can be connected to lower links 5 and to the ends of arms 38 and 39 of chain holder 37 without the aid of auxiliary tools. Yet, they can provide positive limitation of the lowered position of lower links 5. When adjusting to another position, normally at least one chain link has to be altered on each side. The degree of adjustability is dependent on the chain pitch. Finer adjustment would require a turnbuckle, but that often results in bent, damaged or rusted threads which makes fine adjustment difficult.

It is possible to adjust only one of the chains. The resulting unevenness of the two chain lengths is equalized by pivoting of holder 37. This also provides an optimum load distribution and allows the chain strengths to be reduced. No special chains are required.

The invention is not restricted to specific examples which are shown or described. Thus, the apparatus of this invention can also be fixed to the front end of a tractor frame having a self-contained block design. The implements which may be connected do not require any adaptation to the frontal connection apparatus of this invention. And, a tractor having the frontal connection apparatus of this invention may also be used in conjunction with a front loader without removing the frontal connection apparatus. This is because the protrusion of the frontal connection apparatus of this invention in front of the front panelling is small and because the lower links can be swung into inoperative position.

While the principles of this invention have been described in connection with specific embodiments, it should be understood clearly that these descriptions are made only by way of example and are not intended to limit the scope of the invention.

We claim:

1. In tractor frontal connection apparatus of the type including a tractor with front panelling and a front bolster bearing a front axle, two forwardly-extending pivotable lower links, hydraulic cylinder means acting on the lower links, and an upper link secured to an upper connecting lug, the improvement comprising:

the lower links attached to the axle-bearing front bolster at a pivot axis behind the forwardmost point of the front panelling and pivotable to positions behind said forwardmost point, the lower links having rear extensions rearward of the pivot axis; and the hydraulic cylinder means substantially vertically oriented and having a lower end acting vertically on the rear extensions whereby full extension thereof pivots the lower links to a substantially vertical orientation, thereby facilitating movement of lower links to inoperative positions.

2. The tractor frontal connection apparatus of claim 1 further comprising:

a tubular rock shaft rotatably mounted on the front bolster along the pivot axis and having lower lug means extending therefrom in a generally rearward direction; the lower links having journals removably extending into opposite ends of the tubular rock shaft;

a pocket member secured to each end of the rock shaft, each pocket member receiving one of the rear extensions and having a retaining flange adjacent to such rear extension for axial retention of the lower links on the rock shaft; and the hydraulic cylinder means lower end attached to the lower lug means such that the cylinder means rotates the rock shaft to raise and lower the lower links.

3. The tractor frontal connection apparatus of claim 2 wherein each pocket member has a laterally-extending front end portion positioned for engagement with the rear extension to limit relative angular movement of the pocket member and the rear extension, whereby with further rotation of the rock shaft the front end portions of the pocket members engage the rear extensions to rotate the lower links in an upward and rearward direction.

4. The tractor frontal connection apparatus of claim 3 wherein the retaining flange of the pocket member has a generally radially extending rear edge positioned such that rearward manual rotation of each lower link relative to the pocket member rotates the rear extension beyond the retaining flange, whereby each lower link may readily be manually disengaged from the rock shaft.

5. The tractor frontal connection apparatus of claim 3 wherein the front bolster has securement holes on either side thereof in position above the pivot axis, said securement holes engaged by removable stop bolts extending laterally into the paths of the lower links, whereby the lower links may be secured in raised inoperative positions.

6. The tractor frontal connection apparatus of claim 3 further comprising:

the front bolster having a central front recess receiving a power take-off casing; and a bearing element secured to the front bolster and adapted to carry ballast weights, said bearing element defining a draft jaw and supporting a draft jaw bolt extending through the draft jaw.

7. The tractor frontal connection apparatus of claim 6 wherein:

a chain holder is pivotably mounted in the draft jaw by means of said draft jaw bolt, said chain holder having a pair of laterally-extending arms with chain link securement means thereon; and a pair of chains each connected to one of the lower links and extending upwardly to engagement of a selected chain link with one of the chain link securement means, whereby the lower links are adjustably suspended by the chains to define an adjustable lowest position of lower link movement by the hydraulic cylinder means.

8. The tractor frontal connection apparatus of claim 6 wherein the upper connecting lug is on the bearing element.

9. The tractor frontal connection apparatus of claim 3 wherein each pocket member, in addition to the retaining flange and front end portion, comprises:

a pocket main portion extending radially with respect to the pivot axis and adjacent to the retaining flange; at least one pair of aligned holes in the pocket main portion and the retaining flange, said holes radially spaced from pivot axis by a distance less than the radial dimension of the lower link rear extensions; and a retaining bolt through the aligned holes to engage the rear extension, thereby limiting the extent of angular float of the lower links with respect to rock shaft.

10. The tractor frontal connection apparatus of claim 9 comprising a plurality of said pairs of aligned holes, said retaining bolt selectively insertable into the holes of one of said pairs, whereby for each lower link the extent of angular float may be changed.

11. The tractor frontal connection apparatus of claim 9 wherein the retaining flange of the pocket member has a generally radially extending rear edge positioned such that rearward manual rotation of each lower link relative to the pocket member rotates the rear extension beyond the retaining flange, whereby each lower link may readily be manually disengaged from the rock shaft.

12. The tractor frontal connection apparatus of claim 9 wherein the front bolster has securement holes on either side thereof in position above the pivot axis, said securement holes engaged by removable stop bolts extending laterally into the paths of the lower links, whereby the lower links may be secured in raised inoperative positions.

13. The tractor frontal connection apparatus of claim 12 wherein the stop bolts are said retaining bolts, such bolts alternately used to set the extent of angular float of the lower links during operation and to secure the lower links in inoperative positions.

14. The tractor frontal connection apparatus of claim 13 wherein the retaining flange of the pocket member has a generally radially extending rear edge positioned such that rearward manual rotation of each lower link relative to the pocket member rotates the rear extension beyond the retaining flange, whereby each lower link may readily be manually disengaged from the rock shaft.

15. The tractor frontal connection apparatus of claim 1 further comprising:

the front bolster having a central front recess receiving a power take-off casing; and a bearing element secured to the front bolster and adapted to carry ballast weights, said bearing element defining a draft jaw and supporting a draft jaw bolt extending through the draft jaw.

16. The tractor frontal connection apparatus of claim 15 wherein:

a chain holder is pivotably mounted in the draft jaw by means of said draft jaw bolt, said chain holder having a pair of laterally-extending arms with chain link securement means thereon; and     a pair of chains each connected to one of the lower links and extending upwardly to engagement of a selected chain link with one of the chain link securement means, whereby the lower links are adjustably suspended by the chains to define an adjustable lowest position of lower link movement by the hydraulic cylinder means.

17. The tractor frontal connection apparatus of claim 15 wherein the upper connecting lug is on the bearing element.

18. The tractor frontal connection apparatus of claim 17 wherein:

a chain holder is pivotably mounted in the draft jaw by means of said draft jaw bolt, said chain holder having a pair of laterally-extending arms with chain link securement means thereon; and     a pair of chains each connected to one of the lower links and extending upwardly to engagement of a selected chain link with one of the chain link securement means, whereby the lower links are adjustably suspended by the chains to define an adjustable lowest position of lower link movement by the hydraulic cylinder means.

* * * * *